United States Patent
Samakh et al.

(10) Patent No.: US 10,507,620 B2
(45) Date of Patent: Dec. 17, 2019

(54) MODULAR DEVICE FOR POSITIONING TWO COMPONENTS WITH RESPECT TO ONE ANOTHER

(71) Applicant: FAZUP, Delemont (CH)

(72) Inventors: Antoine Samakh, Delemont (CH); Mathieu Samakh, Boulogne Billancourt (FR)

(73) Assignee: FAZUP, Delemont (CH)

( * ) Notice: Subject to any disclaimer, the term of this patent is extended or adjusted under 35 U.S.C. 154(b) by 0 days.

(21) Appl. No.: 15/318,430

(22) PCT Filed: Jun. 16, 2015

(86) PCT No.: PCT/EP2015/063433
§ 371 (c)(1),
(2) Date: Dec. 13, 2016

(87) PCT Pub. No.: WO2015/193286
PCT Pub. Date: Dec. 23, 2015

(65) Prior Publication Data
US 2017/0120511 A1    May 4, 2017

(30) Foreign Application Priority Data
Jun. 18, 2014    (FR) ...................................... 14 55598

(51) Int. Cl.
*B25B 1/20*    (2006.01)
*B29C 65/00*    (2006.01)
(Continued)

(52) U.S. Cl.
CPC ............ *B29C 66/841* (2013.01); *B25B 11/02* (2013.01); *H04B 1/3838* (2013.01); *B29C 65/48* (2013.01)

(58) Field of Classification Search
USPC .................................. 269/45, 303, 304, 305
See application file for complete search history.

(56) References Cited

U.S. PATENT DOCUMENTS

| 4,327,786 A * | 5/1982 | Markkula ................ B23Q 1/03 144/139 |
| 4,497,477 A * | 2/1985 | Abel ....................... C03B 33/04 269/303 |

(Continued)

FOREIGN PATENT DOCUMENTS

| FR | 2 937 826 A1 | 4/2010 |
| WO | 2013/165419 A1 | 11/2013 |

OTHER PUBLICATIONS

International Search Report issued in Patent Application No. PCT/EP2015/063433 dated Sep. 14, 2015.
(Continued)

*Primary Examiner* — Joseph J Hail
*Assistant Examiner* — Shantese L McDonald
(74) *Attorney, Agent, or Firm* — Pearne & Gordon LLP

(57) ABSTRACT

A device for positioning a first element relative to a second element which comprises: a horizontal panel on the upper face of which the first element is able to be disposed and which has a housing able to hold the second element; and first abutment against which the first element is able to come into abutment in a first adjusting direction and second abutment against which the first element is able to come into abutment in a second adjusting direction perpendicular to the first adjusting direction, the first and second abutment being mounted on the panel projecting from the upper face of the panel, The device comprising an arrangement for adjusting the position of the first abutment in the first adjusting direction and an arrangement for adjusting the position of the second abutment means in the second adjusting direction with respect to the position of the housing in the panel.

13 Claims, 2 Drawing Sheets

(51) Int. Cl.
*H04B 1/3827* (2015.01)
*B25B 11/02* (2006.01)
*B29C 65/48* (2006.01)

(56) References Cited

U.S. PATENT DOCUMENTS

| | | | | |
|---|---|---|---|---|
| 4,647,027 | A * | 3/1987 | Shafto | B25B 5/10 |
| | | | | 269/100 |
| 5,901,763 | A * | 5/1999 | You | B23D 47/025 |
| | | | | 144/286.1 |
| 6,149,764 | A * | 11/2000 | Steiner | B41F 27/04 |
| | | | | 101/34 |
| 6,202,530 | B1 * | 3/2001 | Cawley | C03B 33/04 |
| | | | | 269/303 |
| 6,359,216 | B1 | 3/2002 | Liu | |
| 2010/0197369 | A1 | 8/2010 | Mourali et al. | |
| 2014/0009900 | A1 | 1/2014 | Yeo | |

OTHER PUBLICATIONS

Written Opinion issued in Patent Application No. PCT/EP2015/063433 dated Sep. 14, 2015.
International Preliminary Report on Patentability issued in Patent Application No. PCT/EP2015/063433 dated Sep. 19, 2015.
Search Report issued in French Patent Application No. 14 55598 dated Feb. 10, 2015.

* cited by examiner

MODULAR DEVICE FOR POSITIONING TWO COMPONENTS WITH RESPECT TO ONE ANOTHER

TECHNICAL FIELD

The invention relates to a device for positioning two components with respect to one another, which is able to adapt to the dimensions of one of the two components.

The invention more particularly relates to a device for positioning an apparatus with respect to an adhesive component, more particularly a so-called "anti-wave" patch, which is able to adapt to the dimensions of the apparatus, in order to allow for a good positioning of the adhesive component on the apparatus.

PRIOR ART

Some electronic apparatuses such as for example portable telephones, digital tablets or portable computers emit electromagnetic waves. These waves are potentially harmful for the health of the person using such an apparatus, all the more so that the apparatus is used near the body, as is often the case for a portable telephone.

In order to limit the harmfulness of these waves, there are devices that have the form of adhesives, or "patches", that are affixed on the electronic apparatus, and which reduce the quantity of energy conveyed by the radiofrequencies emitted to the user by the apparatus.

Such a patch must be positioned with precision on the apparatus, so that it effectively reduces the power output of the waves, without harming the proper operation of the apparatus.

For this, it is known to market the patch with one or several assembly shells.

Each assembly shell comprises a housing complementary to the shape of the patch, wherein the patch is held, and it further delimits a space with a shape and dimensions complementary to the apparatus or to a portion of the apparatus whereon the patch is to be assembled.

This dual complementarity of the shell with the patch on the one hand and of the shell with the apparatus on the other hand makes it possible to ensure the proper positioning of the patch with respect to the apparatus.

A current shell is produced for example by moulding plastic material.

The patch is intended to be assembled on a plurality of apparatuses that can be of highly varied dimensions. As such, it has been proposed to form a plurality of shells of which each one is adapted to one or several apparatuses.

However, given the quantity of apparatuses whereon such a patch is intended to be assembled, the number of shells that it is then necessary to manufacture is also substantial.

In the case where the patch is sold in a set constituted of a patch and of a plurality of shells, in order to adapt to the dimensions of a majority of apparatuses, the plurality of shells supplied renders the packaging voluminous and the quantity of waste produced is substantial. Also, it is possible that the assembly does not comprise a shell adapted to the apparatus whereon the user desires to assemble the patch.

The invention has for purpose to propose a device for positioning the patch with respect to the apparatus that makes it possible to resolve the problems exposed hereinabove.

DESCRIPTION OF THE INVENTION

The invention proposes a device for positioning a first element with respect to a second element which comprises:

a horizontal panel of which the upper face of which is able to hold the first element and which has a housing able to hold the second element; and first abutment means against which the first element is able to come into abutment in a first adjusting direction and second abutment means against which the first element is able to come into abutment in a second adjusting direction perpendicular to the first adjusting direction, said first and second abutment means being mounted on the panel projecting from the upper face of the panel, characterised in that it comprises means for adjusting the position of the first abutment means in the first adjusting direction and means for adjusting the position of the second abutment means in the second adjusting direction with respect to the position of the housing in the panel.

The adjusting of the positions of the abutment means with respect to the housing allows the abutment means to delimit a housing that holds the first element, such as for example an electronic apparatus, that is positioned with respect to the housing of the second element, such as for example a patch. This positioning can then be a carried out according to dimensional and structural specifications of the apparatus.

It is as such possible to manufacture a single device for positioning that is adapted to the plurality of apparatuses whereon the patch can be mounted.

Preferably, the means for adjusting the position of the first or second abutment means comprise at least one series of orifices formed in the panel which are distributed on the panel along the associated adjusting direction, and said abutment means comprising at least one foot able to be held in an orifice of said series of orifices, which is defined according to the adjustment of the position of said abutment means with respect to the position of the housing.

Preferably, the orifices of each series of orifices are distributed in several alignments parallel to said adjusting direction, with the alignments being offset from one another parallel to said adjusting direction according to a predefined pitch, and the orifices of each alignment are separated by a multiple of said pitch.

Preferably, the abutment means associated with at least one adjusting direction comprise two feet able to be held in two orifices, with each one of these two orifices belonging to one of two series of orifices which are identical and offset perpendicularly to the associated adjusting direction.

Preferably, said abutment means comprise a planar rib perpendicular to the plane of the panel and perpendicular to the adjusting direction of the abutment means, with the rib comprising at least one foot able to be held in an orifice of an associated series of orifices.

Preferably, each rib comprises an upper portion, at least one foot protruding downwards with respect to the upper portion and a shoulder formed on said at least one foot, comprising a lower edge located at an intermediate vertical position between the lower edge of the horizontal portion of the rib and the free lower end edge of the foot.

Preferably, each orifice consists of a notch formed in the panel, which is oriented perpendicularly to the associated adjusting direction.

Preferably, the means for adjusting the position of the abutment means comprise means for guiding as sliding said abutment means along said adjusting direction and comprise a serrated portion formed on the upper face of the panel, which is parallel to the associated adjusting direction, with which a finger integral with the abutment means is able to cooperate.

Preferably, the housing comprises means for adjusting the orientation of the second component with respect to the panel when the second component is held in the housing.

Preferably, the means for adjusting the orientation comprise at least one notch formed at the periphery of the housing wherein a lug complementary with the second component is able to be held.

Preferably, the panel and/or the abutment means are made from a material chosen from foam, cardboard, a plastic material, wood, cork, polystyrene or rubber, or a metal.

BRIEF DESCRIPTION OF THE DRAWINGS

Other characteristics and advantages of the invention shall appear when reading the following detailed description for the understanding of which reference will be made to the annexed figures among which.

DETAILED DESCRIPTION OF PARTICULAR EMBODIMENTS

Figure 1:
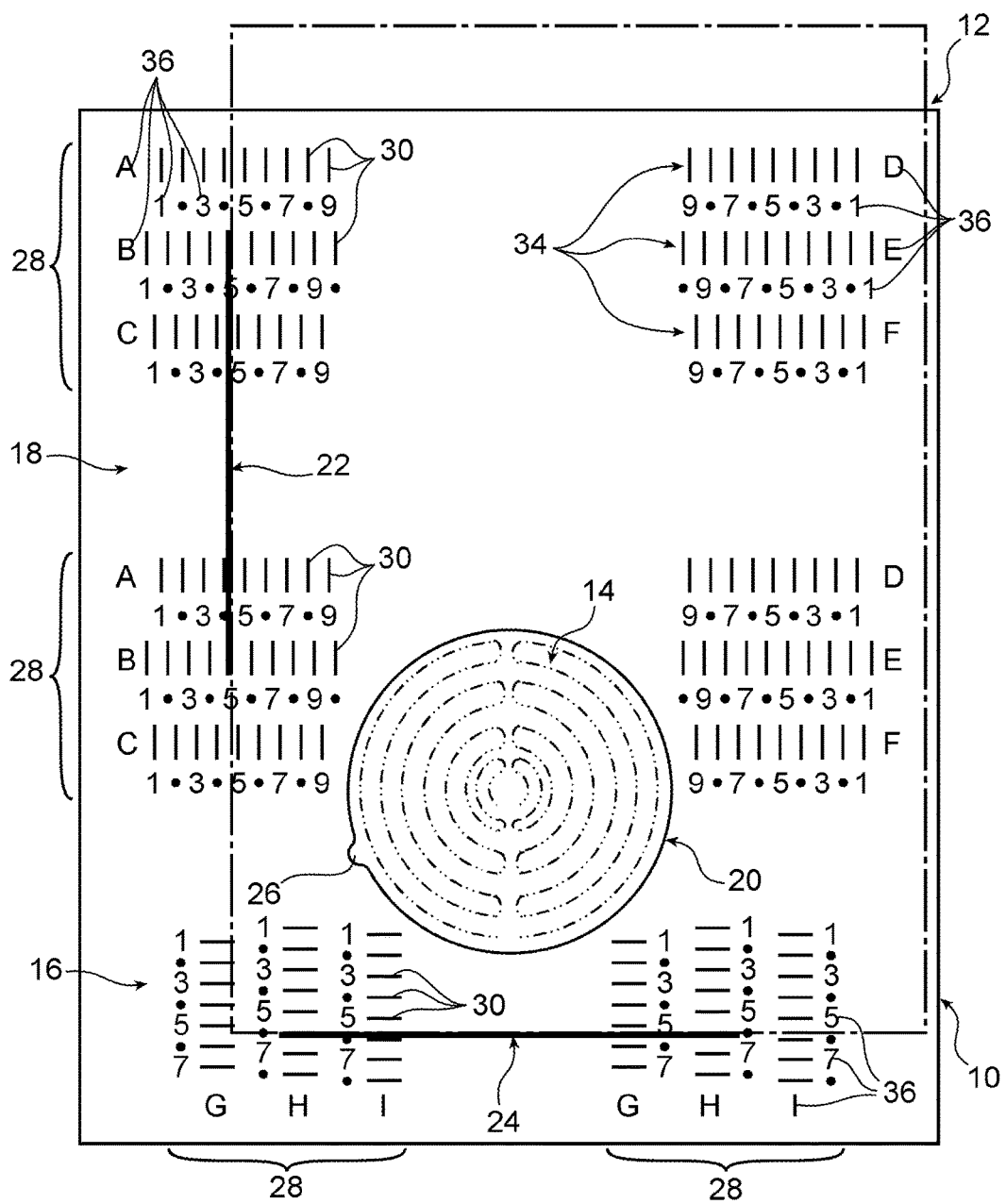
FIG. 1 is a plan view of a device for positioning according to the invention.
Figure 2:
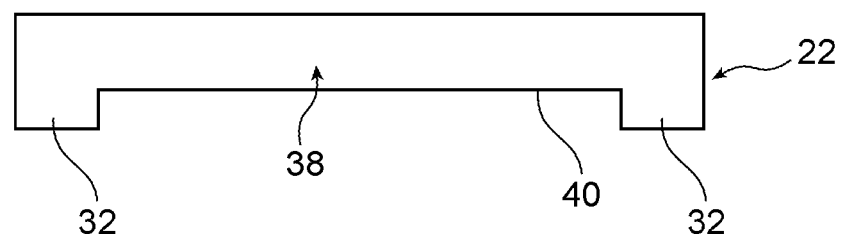
FIG. 2 is a detail of a rib of the device for positioning shown in FIG. 1.

FIG. 1 shows a device for positioning 10 intended to carry out the positioning of a first element 12 with respect to a second element 14.

The first element 12 is for example an electronic apparatus such as a portable telephone. The second element 14 is for example a so-called "anti-wave" patch, that reduced the quantity of energy conveyed by the radiofrequencies emitted to the user by the electronic apparatus 12.

The device for positioning has for final purpose to facilitate the installation of the patch 14 on the electronic apparatus 12, at a particular location of the electronic apparatus 12.

The positioning of the two elements 12, 14 in relation to one another is important as it substantially influenced the effectiveness of the reduction of the energy which is absorbed by the user of the electronic apparatus 12, in particular due to the position of the patch 14 with respect to the internal antennas of the electronic apparatus.

The device for positioning 10 comprises a panel 16 whereon the two elements 12, 14 are positioned, means for positioning 18 the electronic apparatus 12 with respect to the panel 16 and means for positioning 20 the patch 14 with respect to the panel 16.

The means for positioning 18 the electronic apparatus 12 with respect to the panel 16 are abutment means against which the electronic apparatus 12 is able to come into abutment according to two perpendicular directions.

They as such comprise first abutment means 22 against which the electronic apparatus 12 is able to come into abutment in a first direction, which in what follows shall be referred to as the first adjusting direction, which here is the transversal direction of FIG. 1, and second abutment means 24 against which the electronic apparatus 12 is able to come into abutment according to a second direction perpendicular to the first direction, which in what follows shall be referred to as the second adjusting direction, which here is the longitudinal direction of FIG. 1.

These abutment means 22, 24 protrude with respect to the horizontal upper face of the panel 16.

According to the embodiment shown in the figures, each one of the abutment means 22, 24 comprises a rib extending in a plane that is perpendicular to the plane of the panel 16 and to the adjusting direction associated with the abutment means. That is to say that the rib 22 of the first abutment means extends in a vertical longitudinal plane and the rib 24 of the second abutment means extends in a vertical transversal plane.

According to an alternative embodiment not shown, each one of the abutment means 22, 24 comprises at least one stud or post vertical that protrudes with respect to the upper face of the panel 16. At least one of the first or second abutment means 22, 24 comprises at least two studs aligned according to a direction perpendicular to the adjusting direction that is associated to them.

As such, the first abutment means 22 and the second abutment means 24 delimit with the upper face of the panel 16, a corner wherein a corner of the electronic apparatus 12 which is predefined is disposed, which makes it possible to position the electronic apparatus 12 with respect to the panel 16.

The means 20 for positioning the patch 14 consist of a hollow housing formed in the upper face of the panel 16. The shape and the dimensions of the hollow housing 20 are identical to the form and to the dimensions of the patch 14. As such, the patch 14 is correctly positioned on the panel 16 horizontally as well as in orientation about a vertical axis.

Here, the patch 14 has the shape of a disc. The hollow housing 20 consequently also has the shape of a disc of the same diameter.

The bottom of the hollow housing 20, against which the patch 14 rests when it is held in the hollow housing 20, consists of a flexible wall, which is able to be deformed by a press from the user.

For example, the bottom of the hollow housing is carried out by thermoforming or by compression of a flexible material such as a plastic material.

The hollow housing 20 further comprises a notch 26 formed in its peripheral edge, which is intended to hold a tab complementary of the patch 14. This notch 26 and the complementary tab make it possible to define an orientation of the patch 14 with respect to the panel 16, about a central vertical axis of the hollow housing 20.

The device for positioning 10 is carried out in order to be able to hold several different electronic apparatuses 12, of which the dimensions and the configuration are variable between two different electronic apparatuses.

This has for consequence that the location of the electronic apparatus 12 whereon the patch 14 must be placed may not be the same for these different electronic apparatuses.

To this effect, the device for positioning 10 comprises means for adjusting the abutment means 22, 24, that make it possible to modify the position of these abutment means 22, 24 on the panel 16, with respect to the position of the hollow housing 20.

As such, the device for positioning 10 comprises means for the adjusting of the transversal position of the first abutment means 22 on the panel 16 and means for adjusting the longitudinal position of the second abutment means 24 on the panel 16.

According to a preferred embodiment of the invention shown in the figures, the means for adjusting the position of the abutment means 22, 24 comprise, for each one of the abutment means 22, 24, at least one series 28 of orifices 30 which are distributed in the associated adjusting direction of the abutment means 22, 24 and the abutment means 22, 24 comprise a foot 32 associated with each series of orifices 30, which is able to be held in an orifice 30 according to the function of the adjusting of the position of the abutment means 22, 24.

The adjusting of the position of the abutment means 22, 24 has for consequence to adjust the position of the corner intended to hold a corner of the electronic apparatus 12 with respect to the panel 16 and with respect to the position of the patch 14.

Here, each orifice 30 consists of a slot formed in the panel 16 which has an orientation perpendicular to the associated adjusting direction.

It shall be understood that the orifices 30 can have another shape, for example they consist of circular holes.

Here, the rib 22 of the first abutment means comprises two feet 32 disposed at each end of the latter.

As such, the means for adjusting the first abutment means 22 comprises two series 28 of orifices 30 which are offset longitudinally in relation to one another.

Each foot of the rib 22 is associated with a series 28 of orifices 30 and which is able to be held in a predefined orifice 30. The two feet 32 are able to be held in two orifices 30 which are located at the same transversal position on the panel 16.

The longitudinal offset of a series 28 of orifices 30 with respect to the other is substantially equal to the distance between the two feet 32 of the rib 22.

Likewise, the rib 24 of the second abutment means comprises two feet 32 arranged at each end of the latter. As such, the means for adjusting of the second abutment means 24 comprise two series 28 of orifices 30 which are transversally offset with respect to one another.

Each foot of the rub 24 is associated with a series 28 of orifices 30 and is able to be held in a predefined orifice 30. The two feet 32 are able to be held in two orifices 30 which are located at the same longitudinal position on the panel 16.

The transversal offset of a series 28 of orifices 30 with respect to the other is substantially equal to the distance between the two feet 32 of the rib 24.

The orifices 30 of each series 28 are distributed along the adjusting direction according to a predetermined pitch that defined the precision of the adjusting offered by the device 10. As a non-limiting example, the adjusting pitch is one millimetre.

According to a first embodiment not shown, all of the orifices 30 of a series 28 form a single alignment of orifices 30 spaced apart according to the adjusting pitch.

The dimension of the orifices 30 can sometimes be too large to allow for a difference between two orifices 30 equal to the adjusting pitch, which would risk weakening the panel 16 and a user could break the panel 16 before having been able to assemble the patch 14 on the electronic apparatus 12.

That is why, according to another embodiment shown in the figures, each series 28 of orifices 30 comprises a plurality of alignments 34 of orifices 30, here three alignments 34 per series 28.

The alignments 34 of each series 28 are parallel and are offset with respect to one another according to the direction perpendicular to the adjusting direction, i.e. the alignments 34 associated with the first means for adjusting 22 are offset longitudinally and the alignments 34 associated with the second means for adjusting 24 are offset transversally.

Also, the alignments 34 of each series 28 are offset with respect to one another in the adjusting direction and the distance between two orifices 30 of each alignment 34 is greater than the adjusting pitch.

By way of a non-limiting example, the value of the offset between two alignments 34, along the adjusting direction is equal to the adjusting pitch and the distance between two orifices 30 of each alignment 34 is equal to a multiple of the adjusting pitch. This multiple is preferably equal to the number of alignments 34 of the series 28, i.e. here the distance between two orifices is here three times the adjusting pitch.

In order to facilitate the use of the device for positioning 10, in particular for correctly positioning each rib 22, 24 on the panel 16, inscriptions 36 are present on the upper face of the panel 16 that make it possible to identify the orifices 30.

For example, here, each series 28 of orifices 30 is associated with letters that identify the alignments 34 and figures or points that identify the position of each orifice in an alignment.

Two orifices 30 intended to simultaneously hold the two feet 32 of a rib 22, 24 are associated with identical inscriptions.

As such, by consulting a notice associated with the device for positioning 10, a user can, using the reference of his electronic apparatus, identify which are the orifices 30 that will hold the feet 32 of the ribs 22, 24.

Preferably, the inscriptions 36 for the first means for positioning 22 are different from the inscriptions 36 for the second means for positioning 24, so as to prevent any mixing up of the identification of the orifices 30.

From this, the user positions the ribs 22, 24 on the panel 16, he then sets the patch 14 in place in the hollow housing 20 then the electronic apparatus 12 on the panel 16, abutting against the two ribs 22, 24.

The patch 14 is as such correctly positioned with respect to the electronic apparatus 12. The user can then exert a pressure on the bottom of the housing 20, in order to provoke the deformation of the latter, so as to affix the patch 14 on the electronic apparatus 12.

Each rib 22, 24 comprises a vertical upper portion 38 with a main orientation perpendicular to the associated adjusting direction, against which the electronic apparatus 12 is able to come into abutment and two feet 32 that extend in the same plane as the upper portion 38 and which protrude vertically downwards with respect to the lower edge 40 of the upper portion 38.

According to the position of the orifices 30 wherein the feet 32 of the ribs 22, 24 are placed, it may occur that a rib 22, 24 partially overlaps the hollow housing 20. There is then a risk that this rib 22, 24 hinders or prevents correctly affixing the patch 14 on the electronic apparatus 12.

Indeed, the lower edge 40 of the upper portion 38 of the rib bears against the upper face of the panel 16 and is therefore flush with the upper mouth of the housing 20.

Figure 3:
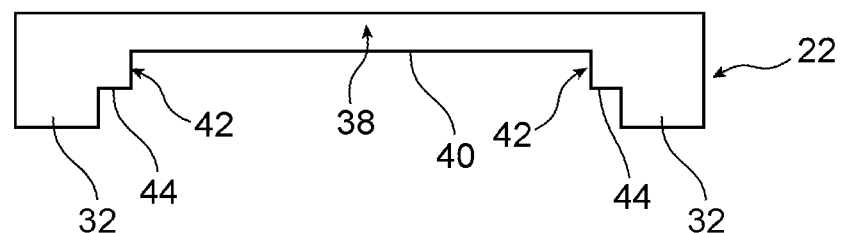
FIG. 3 diagrammatically shows an alternative embodiment of the rib shown in FIG. 2.

In order to limit this hindrance, and as such make it possible to affix the patch 14 on the electronic apparatus 12, according to an alternative embodiment shown in FIG. 3, the ribs 22, 24 are conformed so that the lower edge 40 of the horizontal portion 38 of each rib 22, 24 can be maintained at a distance from the upper face of the panel 16 when the ribs 22, 24 are assembled on the panel 16.

For this, each rib 22, 24 comprises a shoulder 42 which is formed on each foot 32. Each shoulder 42 comprises a lower bearing edge 44 that is located at an intermediate vertical position between the lower edge 40 of the horizontal portion of the rib 22, 24 and the free lower end edge of the foot 32.

When the rib 22, 24 is assembled on the panel 16, the lower edge 44 of the shoulder 42 is bearing against the upper face of the panel 16 in the place of the lower edge 40 of the upper portion 38 of the rib 22, 24.

The lower edge 40 of the upper portion 38 of the rib 22, 24 is then located vertically at a distance from the upper face of the panel 16, which makes it possible to prevent the rib 22, 24 from hindering the action of affixing the patch 14 on the electronic apparatus 12.

The embodiment of the means for adjusting the abutment means 22, 24 which has just been described, consists of an association of orifices 30 with feet 32 of the ribs 22, 24.

According to another embodiment (not shown), the means for adjusting the abutment means 22, 24 consist of means for guiding as sliding of each rib 22, 24 in the associated adjusting direction and means for blocking of each rib 22, 24 in the position of adjusting.

For example, the means for blocking consist of a serrated portion fixed to the panel which holds a finger integral with the rib 22, 24.

According to the configuration of the electronic apparatus 12, it is possible that the positioning thereof on the panel 16 consists in giving it a certain orientation with respect to the panel, i.e. it may be prescribed to pivot the electronic apparatus 12 by an angle of 90, 180 or 270 degrees, i.e. position one of the four corners of the electronic apparatus 12 in the corner defined by the device for positioning 10.

This correction of the orientation of the electronic apparatus 12 implies that it is also required to correct the orientation of the patch 14 with respect to the panel 16 in order to obtain the correct orientation of the patch 14 with respect to the electronic apparatus 12.

To this effect, and according to an alternative embodiment not shown, the hollow housing 20 comprises several notches 26 of which only one can hold the tab of the patch 14. This makes it possible to define several possible orientations of the patch 14 with respect to the panel 16.

For example, the hollow housing 20 comprises four notches 26 distributed at 90 degrees about the main axis of the housing 20.

The components 16, 22, 24 of the device for positioning 10 can be made from any material that allows for the manufacture and use thereof, without involving excessive cost or a risk of breakage before the patch 14 is set into place on the electronic apparatus 12.

As a non-limiting example for the material of the components 16, 22, 24, mention can be made of foam, cardboard, a plastic material, wood, cork, polystyrene or rubber, or a metal.

According to another example, the panel is made from two materials, a first flexible material for forming the housing 20, and more mainly the bottom of the housing 20, and a second more rigid material, forming the rest of the panel 16. This second material can consist of another more rigid plastic material that is overmoulded around the first flexible material.

According to the embodiment of the device for positioning 10 shown in the figures, the latter has the form of three planar elements of low thickness. As such, before the use thereof, i.e. before the assembling of the ribs 22, 24 on the panel 16, the device for positioning forms a planar assembly with a low encumbrance which can be sold as is with a patch 14 and an explanatory notice (for example printed on the back of the panel 16).

The means for packaging of all of these components are then relatively reduced and also with a low encumbrance.

This has an advantage with respect to prior art according to which the plurality of shells that accompany a single patch 14 increases the volume and the cost of the packaged product.

The invention also relates to the set formed by the patch 14 and the device for positioning 10 with, where applicable, the ribs 22, 24 not assembled on the panel 16, i.e. the feet 32 thereof are not introduced into the orifices 30.

It shall be understood that the device for positioning 10 according to the invention is not limited to a patch 14 and an electronic apparatus 12, but applies to the relative positioning of two elements with respect to one another, of which one of the two components is able to be held in the housing 20 and the other is able to come into abutment against the abutment means 22, 24.

What is claimed is:

1. Device for positioning a first element with respect to a second element that comprises:
    a horizontal panel of which the upper face of which is able to hold the first element and which has a housing able to hold the second element;
    first abutment means against which the first element is able to come into abutment in a first adjusting direction and second abutment means against which the first element is able to come into abutment in a second adjusting direction perpendicular to the first adjusting direction, said first and second abutment means being mounted on the panel projecting from the upper face of the panel,
    means for adjusting the position of the first abutment means in the first adjusting direction and means for adjusting the position of the second abutment means in the second adjusting direction with respect to the position of the housing in the panel, and
    at least one series of orifices formed in the panel which are distributed on the panel along the associated adjusting direction,
    wherein said abutment means comprise at least one foot able to be held in an orifice of said series of orifices, which is defined according to the adjusting of the position of said abutment means with respect to the position of the housing,
    wherein the orifices of each series of orifices are distributed in several alignments extending parallel to said respective adjusting direction, with the alignments being separated from one another along the other of the first and second adjusting directions not being the respective adjusting direction, with the orifices of each of the alignments being offset from the orifices of each other alignment of the series along said adjusting direction by a multiple of a predefined pitch,
    wherein the orifices of each alignment are sequentially separated along the respective adjustment direction by a same distance equal to the value of said pitch multiplied by a multiple equal to the number of alignments of said respective series of orifices, said multiple being greater than or equal to two, and
    wherein along the respective adjusting direction, the orifices immediately adjacent each orifice of any particular alignment are separated by free space of the panel absent intervening orifices.

2. Device for positioning according to claim 1, wherein the abutment means associated with at least one adjusting direction comprise two feet able to be held in two orifices, with each one of these two orifices belonging to one of the two series of orifices which are identical and offset perpendicularly to the associated adjusting direction.

3. Device for positioning according to claim 1, wherein said abutment means consist of a planar rib perpendicular to the plane of the panel and perpendicular to the adjusting direction of the abutment means, with the rib comprising at least one foot able to be held in an orifice of a series of associated orifices.

4. Device for positioning as claimed in claim 3, wherein each rib comprises an upper portion, at least one foot protruding downwards with respect to the upper portion and a shoulder formed on said at least one foot, comprising a lower edge located at an intermediate vertical position between the lower edge of the horizontal portion of the rib and the free lower end edge of the foot.

5. Device for positioning as claimed in claim 3, wherein the foot is formed integral with the planar rib.

6. Device for positioning according to claim 1, wherein the means for adjusting the position of the abutment means comprise means for guiding as sliding of said abutment means along said adjusting direction and comprise a serrated portion formed on the upper face of the panel, which is parallel to the associated adjusting direction, with which a finger integral with the abutment means is able to cooperate.

7. Device for positioning as claimed in claim 1, wherein the housing comprises means for adjusting the orientation of the second component with respect to the panel when the second component is held in the housing.

8. Device for positioning as claimed in claim 7, wherein the means for adjusting the orientation comprise at least one notch formed at the periphery of the housing wherein a lug complementary with the second component is able to be held.

9. Device for positioning as claimed in claim 1, wherein the panel and/or the abutment means are made from a material chosen from foam, cardboard, a plastic material, wood, cork, polystyrene or rubber, or a metal.

10. Device for positioning according to claim 1, wherein the value of said pitch equals one millimeter and the value of said multiple of said pitch equals three.

11. Device for positioning as claimed in claim 1, wherein the orifices of each alignment of a respective series are offset from the orifices of no more than a pair of other alignments of the respective series by pitch*1 and pitch*-1, respectively, along the respective adjustment direction.

12. Device for positioning a first element with respect to a second element that comprises:
  a horizontal panel of which the upper face of which is able to hold the first element and which has a housing able to hold the second element;
  first abutment means against which the first element is able to come into abutment in a first adjusting direction and second abutment means against which the first element is able to come into abutment in a second adjusting direction perpendicular to the first adjusting direction, said first and second abutment means being mounted on the panel projecting from the upper face of the panel,
  means for adjusting the position of the first abutment means in the first adjusting direction and means for adjusting the position of the second abutment means in the second adjusting direction with respect to the position of the housing in the panel, and
  at least one series of orifices formed in the panel which are distributed on the panel along the associated adjusting direction,
  wherein said abutment means comprise at least one foot able to be held in an orifice of said series of orifices, which is defined according to the adjusting of the position of said abutment means with respect to the position of the housing,
  parallel to said adjusting direction, with the alignments being offset from one another parallel to said adjusting direction according to a predefined pitch,
  wherein the orifices of each alignment are separated by a distance equal to the value of said pitch multiplied by a multiple, wherein said multiple equals the number of alignments of said series of orifices, and said multiple being greater than or equal to two, and
  wherein said abutment means consist of a planar rib perpendicular to the plane of the panel and perpendicular to the adjusting direction of the abutment means, with the rib comprising at least one foot formed integral therewith and able to be held in an orifice of a series of associated orifices.

13. Device for positioning as claimed in claim 12, wherein each rib comprises an upper portion, at least one foot protruding downwards with respect to the upper portion and a shoulder formed on said at least one foot, comprising a lower edge located at an intermediate vertical position between the lower edge of the horizontal portion of the rib and the free lower end edge of the foot.

* * * * *